United States Patent [19]

Allen et al.

[11] Patent Number: 5,421,413
[45] Date of Patent: Jun. 6, 1995

[54] FLEXIBLE FAIRINGS TO REDUCE VORTEX-INDUCED VIBRATIONS

[75] Inventors: Donald W. Allen, Katy; Dean L. Henning, Needville, both of Tex.

[73] Assignee: Shell Oil Company, Houston, Tex.

[21] Appl. No.: 147,176

[22] Filed: Nov. 2, 1993

[51] Int. Cl.6 .................. E21B 17/01; E21B 43/01
[52] U.S. Cl. ......................... 166/335; 166/367; 405/211
[58] Field of Search ............ 166/350, 359, 367, 335; 114/243; 405/195, 216, 224.2, 303, 211; 175/7, 9

[56] References Cited

U.S. PATENT DOCUMENTS

| | | | |
|---|---|---|---|
| 3,248,886 | 5/1966 | Blenkarn | 405/211 X |
| 3,352,118 | 11/1967 | Burkhardt | 114/243 X |
| 3,612,176 | 10/1971 | Bauer et al. | 166/359 |
| 3,884,173 | 5/1975 | Fabula | 114/235 F |
| 4,190,012 | 2/1980 | Rispin et al. | 114/243 |
| 4,398,487 | 8/1983 | Ortloff et al. | 114/243 |
| 4,470,722 | 9/1984 | Gregory | 405/195 |
| 4,474,129 | 10/1984 | Watkins et al. | 114/243 |
| 4,657,116 | 4/1987 | Gardner et al. | 187/1 R |
| 4,909,327 | 3/1990 | Roche | 166/359 |
| 5,214,244 | 5/1993 | Cummings et al. | 174/42 |

OTHER PUBLICATIONS

M. M. Zdravkovich, "Review and Classification of Various Aerodynamic and Hydrodynamic Means for Suppressing Vortex Shedding," *Journal of Wind Engineering and Industrial Aerodynamics*, 7 (1981) 145–189.

M. J. Every et al., "Vortex-Excited Vibrations of Cylinders and Cables and Their Suppression," *Ocean Engng.*, 9, No. 2, (1982) 135–157.

A. R. Packwood, "Performance of Segmented Swept and Unswept Cable Fairings at Low Reynolds Numbers," *Ocean Engng.* 17, No. 4, (1990).

*Primary Examiner*—Stephen J. Novosad
*Attorney, Agent, or Firm*—Del S. Christensen

[57] ABSTRACT

A method to reduce vortex-induced vibrations in subsea risers is provided wherein a flexible fairing is provided surrounding the riser. The flexible fairing will reduce displacements caused by vortex induced vibrations regardless of the direction of the current and will be tolerant of marine life growth.

13 Claims, 1 Drawing Sheet

FLEXIBLE FAIRINGS TO REDUCE VORTEX-INDUCED VIBRATIONS

FIELD OF THE INVENTION

This invention relates to a method for reduction of vortex-induced vibration of a riser submersed in a liquid medium and for a riser that would experience reduced vortex-induced vibration in a subsea environment.

BACKGROUND OF THE INVENTION

When subsea risers are subjected to even moderate currents, forces resulting from vortex shedding can result in vibrations. These vibrations can, depending on the stiffness and the strength of the riser and the welds between the riser joints, lead to unacceptably short fatigue lives. Vibrations can be particularly severe when they are of frequencies that coincide with natural resonant frequencies of the riser.

Many methods have been developed to reduce vibrations of subsea risers. Some of these methods function by modifying the boundary layer of the flow around the riser to prevent the correlation of vortex shedding along the length of the riser. Examples of such a method include the inclusion of helical strakes around the riser, axial rod shrouds and perforated shrouds. Helical strakes are often used around chimneys, and are occasionally used in subsea applications. These devices all may create additional drag, and can become ineffective if they are covered by marine life such as barnacles. They are also costly and time consuming to install.

Other methods to reduce vibrations caused by vortex shedding from subsea risers operate by stabilization of the wake. These methods include streamlined fairings, wake splitters and flags.

Streamlined, or teardrop shaped, fairings that swivel around a riser have been developed that almost eliminate the sheading of vortexes. The major drawbacks to teardrop shaped fairings is the cost of the fairing and the time required to install such fairings. Additionally, long term operation in a subsea environment can cause the shape of the fairing to change do to buildup of marine growth such as barnacles and other sea life. It is also critical for acceptable operation of these fairings that they remain rotatable. If they do not rotate, a cross-current could result in vortex shedding that induces greater vibration than the bare riser would incur. The effectiveness of the fairing is also decreased with increases in surface roughness caused by barnacles.

Wake splitters are flat plates that extend from the back of a riser parallel to the current flow direction. These wake splitters have been found to be effective to create a symmetric vortex pattern so that each vortex "sees" an image created by the rigid splitter plate giving symmetry with respect to the axis in the direction of flow. Splitter plates also stabilize the separation points, decrease the wake width and reduce drag. Splitter plates suffer from most of the same detrimental effects as teardrop shaped fairings for off-axis currents. They must therefore either be rotatable or be used only where the direction of a significant current does not vary.

Flags are similar to wake splitters, but are flexible. They are not generally as effective as wake splitters, but have the advantage that they can wrap around a riser and remain somewhat effective with varying current directions without being rotatable. Disadvantages include the probability that the flag will eventually completely wrap around the riser and therefore becomes ineffective. Flags are not commonly used in subsea applications due to this high probability of the flag wrapping itself around the riser, and because of the difficulty and expense of attaching the flag to the riser along the length of the riser.

It is therefore an object of the present invention to provide a method and an apparatus to reduce vortex induced vibrations in subsea risers that can be economically employed, and will function regardless of relative direction of current. It is a further object to provide such a method and apparatus that will not be subject to deterioration in performance do to marine growth.

SUMMARY OF THE INVENTION

These and other objects are accomplished by a method to reduce vortex induced vibrations in a subsea riser, the method comprising the steps of:

providing a flexible and radially continuous shroud around the outer diameter of the riser;

attaching the flexible and radially continuous shroud to the riser at at least one point along the axial length of the riser; and permitting current in the subsea environment of the riser to move the flexible and radially continuous shroud to a position where it is extended downstream and effective to reduce vortex induced vibrations compared to the vortex induced vibrations that would be experienced by a bare riser.

The flexibility of the shroud of the present invention reduces build-up of marine life on the shroud. The flexible shroud is also a simple and reliable method to accommodate a changing relative direction of current. A shroud such as the one of the present invention can be provided on existing risers and is easily provided on risers as they are installed.

The flexible shroud preferably has a circumference of about $2\pi$ to about $5\pi$ times the equivalent outside diameter of the riser. Larger shrouds are only sightly more effective, and increase the cost of the shroud. Smaller shrouds are not sufficiently effective.

The flexible shroud can be made of any flexible material that can withstand prolonged movement in a subsea environment. Fabrics, polymer films, or reinforced polymer films are examples.

DETAILED DESCRIPTION OF THE INVENTION

Figure 1:
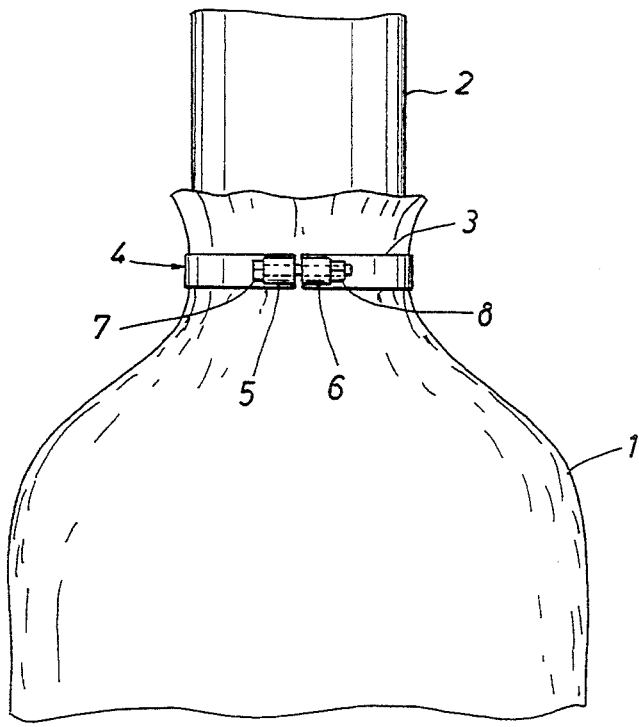
FIG. 1 and FIG. 2 show two embodiments of the shroud of the present invention around a riser.

The riser of the present invention is meant to be any pipe, structural member, cable or other line in a body of water where currents could be sufficiently great to induce vibrations due to vortex shedding. Large fresh water bodies and rivers along with oceans are such bodies of water. The risers typically of concern are vertical, such as legs of platforms, drilling risers from subsea drilling for oil or gas, subsea pipelines, or control lines or conduits. The risers could also be horizontal, obtuse or catenary. Relatively unsupported risers will be more susceptible to vibrations, and therefore more likely to benefit from the deformable fairing of the present invention.

The flexible and radially continuous shroud is made of a deformable material that will tolerate the subsea environment such as nylon reinforced vinyl, film polymers, such as polyvinyl chloride or polyethylene, or natural, synthetic or blended fabrics. The radially continuous shroud by be provided as a tube, or as a sheet and connected along opposite edges after being placed around the riser. It has been found that for relatively small shrouds (small relative to the size of the riser) of the present invention, a stiffer shroud will tend to be more effective. It is possible that such increased effectiveness may be due to a tendency to maintain more of an teardrop shape as opposed to maintaining the shape of a wake splitter. Another possible explanation is that the stiffer material may resist fluttering to a greater degree. The relatively small shrouds that are more effective when made from a flexible but relatively stiff material are those having circumferences of about $2\pi$ times the outer diameter of the riser. The shroud must be flexible enough that currents that could otherwise cause vortex induced vibrations will cause the shroud to wrap around the riser and form a fairing.

The shroud of the present invention is attached to the riser at one or more locations to prevent the shroud from floating up or sinking downward. The attachment may be by any means known in the art, such as clamps or fasteners. The shrouds of the present invention will generally be more dense than water, and it would therefore be, in these cases, preferable to connect the shroud to the riser at the top of the shroud.

The entire riser may be surrounded by a single shroud, but for long risers, it will be preferably to provide a plurality of shrouds along the length of the riser so that the shrouds are more easily handled and installed.

The entire length of the riser does not need to be surrounded by a shroud of the present invention for the shroud to be effective to reduce vortex induced vibrations. The most effective locations for segments of shrouds is at anti-nodes of resonant frequency vibration. Preferably, about half or more of an unsupported segment of the riser is surrounded by the flexible shroud of the present invention.

The size of the shroud of the present invention relative to the size of the riser is refereed to in terms of the equivalent diameter of the riser. The riser may be of a circular cross section, but other shapes are acceptable. When the riser is not of a circular cross section, the equivalent diameter is meant to be the diameter of the largest circle that can be made around the cross section of the riser.

Referring now to FIG. 1, a shroud, 1, of the present invention is shown clamped to a riser, 2. A clamp, 3, is shown as a flexible band, 4, with bolthousings, 5 and 6, at each end, and aligning with each other when the flexible band, 4, is wrapped around the shroud and the riser. The bolthousings may optionally contain internal threads. A bolt 7, is shown inserted through both bolthousings with a locknut, 8, securing the housings as close as possible to each other and securing the shroud to the riser.

Figure 2:
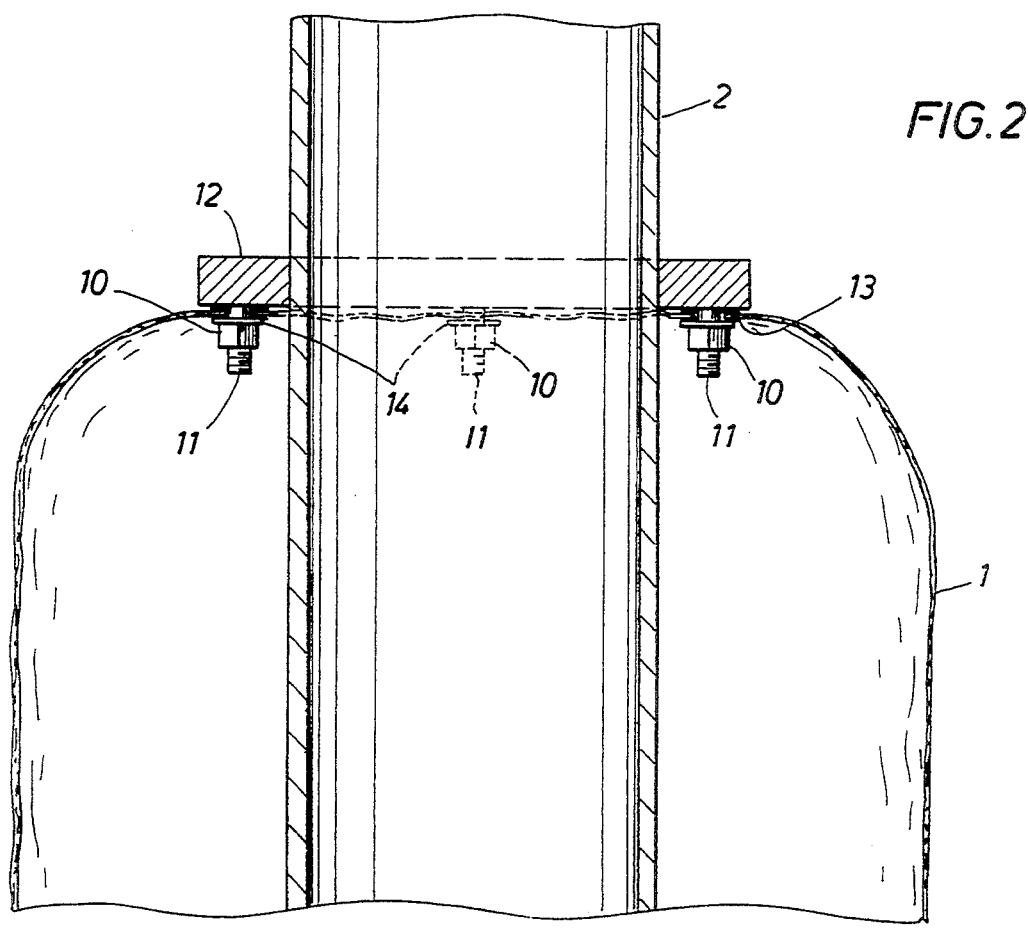

Referring now to FIG. 2, another embodiment of the present invention is shown in a cross-sectional view. A shroud, 1, is connected to a riser, 2, by locknuts, 10, threaded onto studs, 11, protruding from and connected to a flange, 12. The shroud has reinforced holes, 13, that fit over the studs, 11, and allow the reinforced portions of the shroud to be held in place. Washers, 14 may be inserted underneath the locknuts to protect the shroud and increase the surface area holding the reinforced portion of the shroud against the flange.

EXAMPLES

The effectiveness of flexible shrouds to reduce vortex-induced vibrations was demonstrated by measurement of vibration amplitudes of a 2-inch diameter pipe in a current tank with and without shrouds according to the present invention. The test tube was a 53-inch long aluminum tube with a 0.065-inch wall thickness. The tube was mounted vertically as a cantilever with the free end pointing downward. The entire tube was submersed and exposed to a current.

The deformable fairings according to the present invention were made of nylon reinforced vinyl of about 0.023-inch thickness. The fairings were made of a sheet and a tube was formed by heat sealing two opposing edges. Double thickness fairings were formed by heat sealing two vinyl sheets together before sealing the edges together. A hose clamp was used to connect the top of the fairing to the tube near the upper end of the tube.

A Columbian Model HEVP-14 Biaxial Accelerometer was mounted inside the free end of the test pipe and used to measure accelerations at this location. The flow velocity was measured with a Swoffler Model 2100 electromagnetic flowmeter placed about 12 feet downstream of the pipe and off to one side so that it was outside of the cylinder wake but away from the current tank wall. The current was kept at 10.0 feet per second for each test.

Analog voltage signals from the accelerometer were amplified using Labtech Notebook data acquisition software and stored on a disk drive of a Compaq personal computer. The sampling frequency was 128 Hz. Raw data from the accelerometer was processed according to the following steps:

1. The raw data was scaled according to the setting on the charge amplifiers and converted to the proper engineering units.
2. The accelerations were Fourier transformed to obtain the inline and the transverse acceleration frequency spectra.
3. The spectra were filtered with a high-pass filter@ 1 Hz and low pass filter@ 32 Hz, in order to eliminate noise.
4. The spectra were inverse Fourier transformed to yield acceleration time histories.
5. The filtered accelerations were double integrated using the trapezoidal rule in the time domain to produce displacement time histories.
6. Root mean square (RMS) displacements were computed from the time histories.

Flexible fairings were tested having circumferences of $2\pi$, $3\pi$, $4\pi$, $5\pi$ and $6\pi$ times the outer diameter of the tube with both single and double thickness fairings tested for each size. The bare tube was tested to obtain a base case. Normalized displacements are defined as the RMS displacement of the tube with transverse direction as a function of fairing size for both single and double thickness fairings. FIG. 4 is a plot of the normalized displacement in the inline direction as a function of fairing size for both single and double thickness fairings.

The RMS displacements of vibrations were significantly reduced by the presence of the flexible fairings of the present invention.

The foregoing preferred embodiments and examples are exemplary, and reference should be made to the following claims to determine the scope of the present invention.

We claim:

1. A method to reduce vortex induced vibrations in a subsea riser, the method comprising the steps of:
   providing a flexible and radially continuous shroud around the outer diameter of the riser;
   attaching the flexible and radially continuous shroud to the riser at the top of the shroud, wherein the shroud is not otherwise connected to the riser; and
   permitting current in the subsea environment of the riser to move the flexible and radially continuous shroud to a position where it is extended downstream and effective to reduce vortex-induced vibrations compared to the vortex-induced vibrations that would be experienced by a bare riser.

2. The method of claim 1 wherein a plurality of flexible and radially continuous shrouds are provided along the axial length of the riser.

3. The method of claim 1 wherein the outside circumference of the flexible and radially continuous shroud is from about $2\pi$ to about $5\pi$ times the equivalent outer diameter of the riser.

4. The method of claim 1 wherein the shroud is clamped to the riser at the top of the shroud.

5. The method of claim 2 wherein the plurality of shrouds cover more than about 10 percent of the axial length of the riser.

6. The method of claim 5 wherein the plurality of shrouds cover more than about 40 percent of the axial length of the riser.

7. A subsea riser having reduced vortex-induced vibrations comprising:
   a) a subsea riser;
   b) a flexible radially continuous shroud; and
   c) a means to connect the top of the shroud to the riser wherein the shroud is not otherwise connected to the riser and the shroud surrounds the subsea riser coaxially.

8. The riser of claim 7 wherein the flexible radially continuous shroud has an outside circumference of from about $2\pi$ to about $5\pi$ times the equivalent outer diameter of the subsea riser.

9. The riser of claim 7 wherein a plurality of flexible and radially continuous shrouds are provided along the axial length of the riser.

10. The riser of claim 9 wherein the outside circumference of the flexible and radially continuous shroud is from about $2\pi$ to about $5\pi$ times the equivalent outer diameter of the riser.

11. The riser of claim 7 wherein the means to connect the flexible radially continuous shroud to the riser comprises a clamp.

12. The riser of claim 9 wherein the plurality of shrouds cover more than about 10 percent of the axial length of the riser.

13. The riser of claim 12 wherein the plurality of shrouds cover more than about 40 percent of the axial length of the riser.

* * * * *